US010102437B2

United States Patent
Nomura

(10) Patent No.: US 10,102,437 B2
(45) Date of Patent: Oct. 16, 2018

(54) VEHICLE DRIVING HAZARD RECOGNITION AND AVOIDANCE APPARATUS AND VEHICLE CONTROL DEVICE

(71) Applicant: SUBARU CORPORATION, Tokyo (JP)

(72) Inventor: Naoki Nomura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/241,884

(22) Filed: Aug. 19, 2016

(65) Prior Publication Data
US 2017/0076161 A1    Mar. 16, 2017

(30) Foreign Application Priority Data

Sep. 10, 2015 (JP) ................................. 2015-178956

(51) Int. Cl.
*G06K 9/00* (2006.01)
*G06K 9/46* (2006.01)
*G06K 9/52* (2006.01)

(52) U.S. Cl.
CPC ....... *G06K 9/00805* (2013.01); *G06K 9/4604* (2013.01); *G06K 9/52* (2013.01)

(58) Field of Classification Search
CPC ..... G06K 9/00805; G06K 9/4604; G06K 9/52
See application file for complete search history.

(56) References Cited

U.S. PATENT DOCUMENTS

2014/0267699 A1* 9/2014 Dorrance ................. G06K 9/60
348/135
2014/0267793 A1* 9/2014 Wang ................. G06K 9/00785
348/207.1
(Continued)

FOREIGN PATENT DOCUMENTS

CN     103745196 A      4/2014
DE    102014226076 A1   7/2015
(Continued)

OTHER PUBLICATIONS

Decision to Grant a Patent dated Mar. 21, 2017, issued in corresponding Japanse Patent Application No. 2015-178956, with English language translation.
(Continued)

*Primary Examiner* — Nirav G Patel
(74) *Attorney, Agent, or Firm* — McDermott, Will & Emery LLP

(57) ABSTRACT

A vehicle exterior environment recognition apparatus includes a computer configured to serve as a target region setting unit, an edge counter, and a wheel determiner. The target region setting unit sets, as one or more target regions, one or more predetermined ranges of a screen. The edge counter provides setting of a plurality of divided sections, by dividing each of the one or more target regions with borderlines radiated from a center of each of the one or more target regions, and counts the number of predetermined slant edges and the total number of blocks in each of the plurality of divided sections. The wheel determiner determines wheel-likeliness of each of the one or more target regions, based on a rate of the number of the slant edges to the total number of blocks in each of the plurality of divided sections.

17 Claims, 5 Drawing Sheets

(56) References Cited

U.S. PATENT DOCUMENTS

2015/0161447 A1    6/2015  Fu et al.
2015/0186723 A1    7/2015  Liu et al.

FOREIGN PATENT DOCUMENTS

| JP | H11-149560 A  | 6/1999 |
| JP | 3349060 B2    | 11/2002 |
| JP | 2008-134877   | 6/2008 |
| JP | 2012-243155 A | 12/2012 |
| JP | 2013-232080 A | 11/2013 |

OTHER PUBLICATIONS

Simon Prince, "Computer Vision: Models, Learning, and Inference," Cambridge: Cambridge University Press, ISBN 978-1-107-01179-3, p. 285 (2012).

Moment (Bildverarbeitung). In: Wikipedia, the free encyclopedia. Editing status Jul. 27, 2015. URL: https://de.wikipedia.org/w/index.php?title_Moment_(Bildverarbeitung)&oldid=144446370 [retrieved on Mar. 9, 2018].

Office Action issued in corresponding German Patent Application No. 10 2016 116 601.4, dated Mar. 17, 2018.

Office Action issued in corresponding Chinese Patent Application No. 201610808114.8, dated Oct. 10, 2017.

Hong-liang Wang et al., "A Localization Method of Vehicle Wheels Based on Hough Transform", Fire Control & Command Control, vol. 36, No. 11, pp. 25-27 (Nov. 2011) (w/English Abstract only).

\* cited by examiner

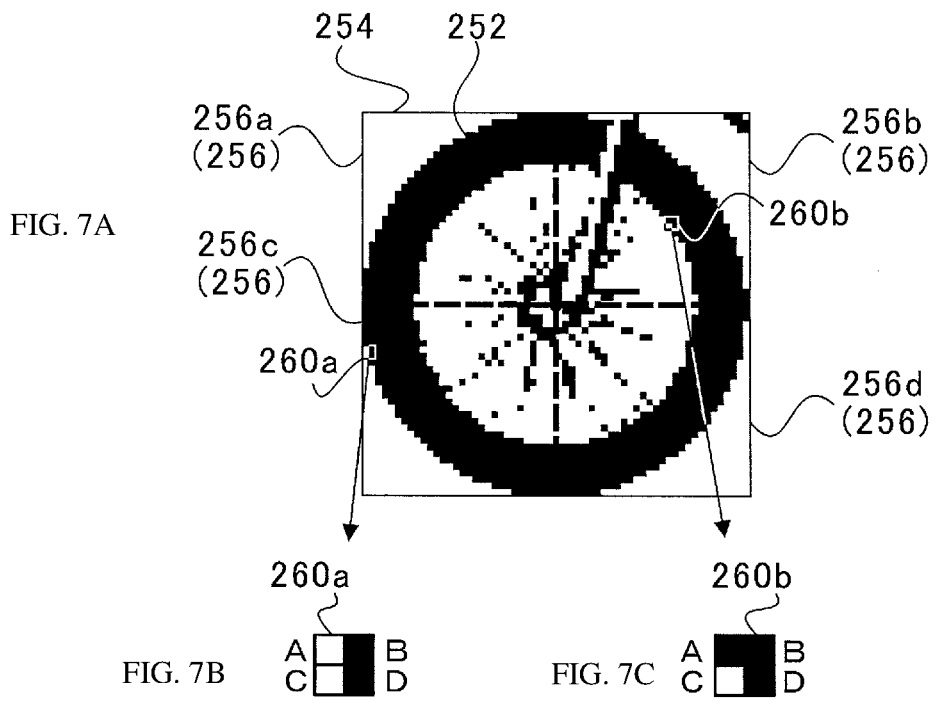
FIG. 7A
FIG. 7B  FIG. 7C
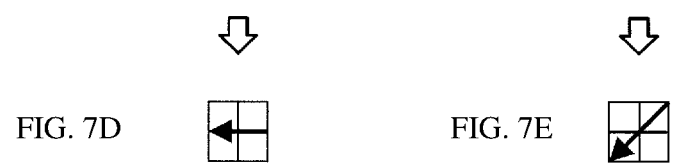
FIG. 7D  FIG. 7E
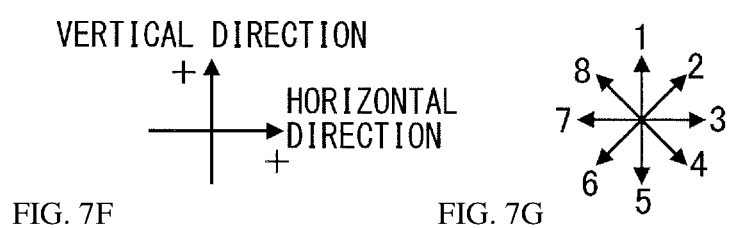
FIG. 7F  FIG. 7G

VEHICLE DRIVING HAZARD RECOGNITION AND AVOIDANCE APPARATUS AND VEHICLE CONTROL DEVICE

CROSS-REFERENCE TO RELATED APPLICATIONS

The present application claims priority from Japanese Patent Application No. 2015-178956 filed on Sep. 10, 2015, the entire contents of which are hereby incorporated by reference.

BACKGROUND

The technology relates to a vehicle exterior environment recognition apparatus that identifies a specific object present in a traveling direction of an own vehicle.

A technique has been proposed in which a three-dimensional object, such as a vehicle located ahead of an own vehicle, is detected to perform a control that avoids collision with a preceding vehicle (i.e., a collision avoidance control) or to perform a control that keeps a safe inter-vehicular distance from the preceding vehicle (i.e., a cruise control). For example, reference is made to Japanese Patent No. 3349060.

As a technique that detects the presence of the three-dimensional object, Japanese Unexamined Patent Application Publication (JP-A) No. 2008-134877 discloses a technique in which a parallel-traveling vehicle that travels parallel with the own vehicle is detected, with reference to an image pattern photographed sideward of the own vehicle, based on symmetry of an edge of the own vehicle in a front-rear direction of the own vehicle.

SUMMARY

Non-limiting examples of the specific object present in the traveling direction of the own vehicle may include the preceding vehicle that travels in a same direction, and objects such as a pedestrian and a bicycle that crosses a traveling path in a lateral direction of the own vehicle. Regarding the objects such as the pedestrian and the bicycle that cross the traveling path, it is desirable to determine their pedestrian-likeliness or bicycle-likeliness, based on their outlines. The bicycle, however, generally crosses faster than the pedestrian does. If the collision avoidance control is postponed until confirmation of the entire outline of the bicycle, a distance from the own vehicle to the bicycle may become short during the postponement. This may necessitate an abrupt action as the collision avoidance control.

It is desirable to provide a vehicle exterior environment recognition apparatus that makes it possible to promptly detect a specific object such as a bicycle.

An aspect of the technology provides a vehicle exterior environment recognition apparatus that includes a computer configured to serve as a target region setting unit, an edge counter, and a wheel determiner. The target region setting unit sets, as one or more target regions, one or more predetermined ranges of a screen. The edge counter provides setting of a plurality of divided sections, by dividing each of the one or more target regions with borderlines radiated from a center of each of the one or more target regions, and counts the number of predetermined slant edges and the total number of blocks in each of the plurality of divided sections. The wheel determiner determines wheel-likeliness of each of the one or more target regions, based on a rate of the number of the slant edges to the total number of blocks in each of the plurality of divided sections.

The edge counter may divide each of the one or more target regions with the borderlines radiated horizontally and vertically from the center of each of the one or more target regions.

The edge counter may derive one or more centers of gravity of the slant edges, for each of the plurality of divided sections. The wheel determiner may determine the wheel-likeliness of each of the one or more target regions, based on relative distances from the centers of gravity to a reference position that is predetermined for each of the plurality of divided sections.

The wheel determiner may weight the plurality of divided sections, to allow a movement-wise and road-surface-wise positioned one of the plurality of divided sections to be more heavily weighted against remaining ones of the plurality of divided sections.

The one or more target regions may include a plurality of target regions that are differently sized based on a plurality of specifications of a wheel of a bicycle. The target region setting unit may provide the setting of the plurality of target regions.

BRIEF DESCRIPTION OF THE DRAWINGS

FIGS. 7A-7G describe the edge counting process.

DETAILED DESCRIPTION

Figure 1:
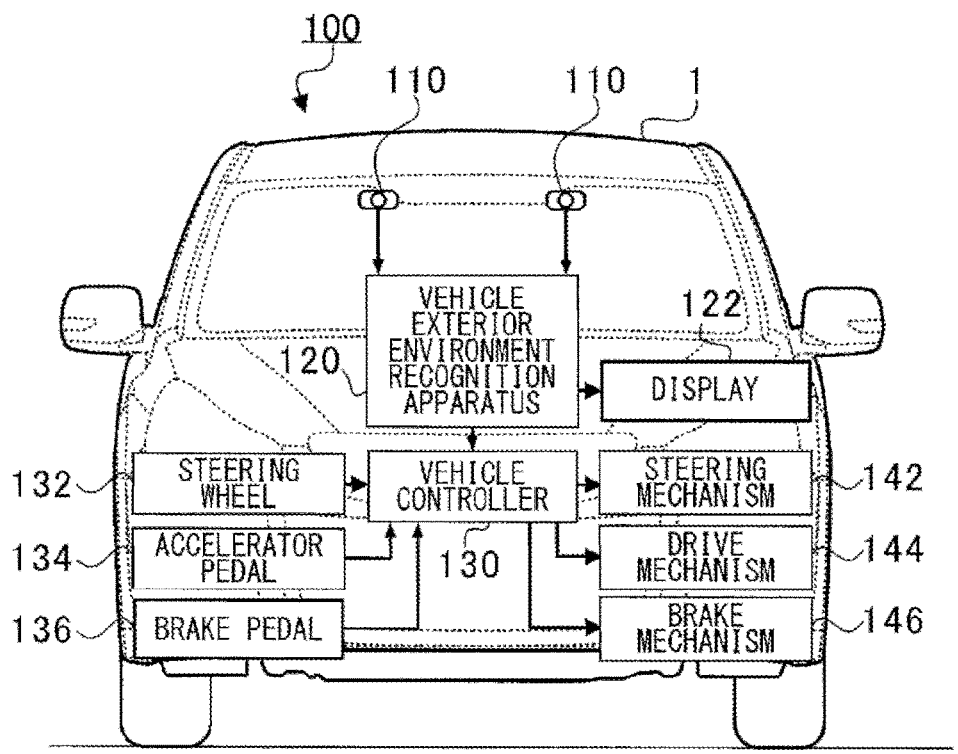
FIG. 1 is a block diagram illustrating a relation of connection in a vehicle exterior environment recognition system.

In the following, some preferred but non-limiting implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Throughout the present specification and the drawings, elements having substantially the same function and configuration are denoted with the same reference numerals to avoid any redundant description. Further, elements that are not directly related to the technology are unillustrated in the drawings.

[Vehicle Exterior Environment Recognition System 100]

FIG. 1 is a block diagram illustrating a relation of connection in a vehicle exterior environment recognition system 100. The vehicle exterior environment recognition system 100 may include image-capturing units 110, a vehicle exterior environment recognition apparatus 120, and a vehicle controller (e.g., an engine control unit (ECU)) 130. The implementation may include two image-capturing units 110 without limitation.

The image-capturing units 110 each may include an imaging device such as, but not limited to, a charge-coupled device (CCD) and a complementary metal-oxide semiconductor (CMOS). The image-capturing units 110 each may capture an image of vehicle exterior environment ahead of the own vehicle 1, and generate a luminance image in form of a color image or a monochrome image. The luminance image may include at least luminance information. The image-capturing units 110 may be so disposed that their respective optical axes become substantially parallel to each other along a traveling direction of the own vehicle 1. The two image-capturing units 110 may be so disposed as to be separated away from each other in a substantially horizontal direction. The image-capturing units 110 may continuously generate the luminance image for each frame of, for example but not limited to, 1/60 second (at a frame rate of 60 fps). The luminance image may be an image that captures a three-dimensional object present in a detected region ahead of the own vehicle 1. In the implementation, the image-capturing units 110 may generate the luminance images from different viewpoints, making it possible to grasp a distance from the own vehicle 1 to the three-dimensional object. Non-limiting examples of the three-dimensional objects to be recognized by the image-capturing units 110 may include a three-dimensional object that is present independently, as well as an object identifiable as a part of the three-dimensional object. Non-limiting examples of the independently-present three-dimensional object may include a bicycle, a pedestrian, a vehicle, a traffic light, a road (or a traveling path), a road sign, a guardrail, and a building. Non-limiting examples of the object identifiable as a part of the three-dimensional object may include a wheel of a bicycle.

The vehicle exterior environment recognition apparatus 120 may obtain the luminance images from the respective image-capturing units 110, and derive a parallax (i.e., a relative distance) with use of so-called pattern matching, from the obtained luminance images. The pattern matching may involve extracting any block (i.e., a group of a plurality of pixels) from one of the luminance images, and searching for a corresponding block in another of the luminance images. The vehicle exterior environment recognition apparatus 120 may also derive an on-screen position of the relevant block, from the obtained luminance images. The on-screen position refers to a position of the relevant block on the screen. Thus, the vehicle exterior environment recognition apparatus 120 may derive a three-dimensional position of each block, based on the parallax and the on-screen position. Also, the vehicle exterior environment recognition apparatus 120 may identify the three-dimensional object present in vehicle exterior environment. Non-limiting examples of the three-dimensional object present in the vehicle exterior environment may include a preceding vehicle that travels in a same direction, and objects such as a pedestrian and a bicycle that cross a traveling path in a lateral direction of the own vehicle. When the three-dimensional object is identified, the vehicle exterior environment recognition apparatus 120 may further control the own vehicle 1, to avoid collision with the three-dimensional object (i.e., a collision avoidance control) or to keep a safe inter-vehicular distance from the preceding vehicle (i.e., cruise control).

The vehicle controller 130 may control the own vehicle 1 by receiving information on an operation input of the driver through a steering wheel 132, an accelerator pedal 134, and a brake pedal 136 and sending the information on the operation input to a steering mechanism 142, a drive mechanism 144, and a brake mechanism 146. The vehicle controller 130 may control the steering mechanism 142, the drive mechanism 144, and the brake mechanism 146, in accordance with instructions from the vehicle exterior environment recognition apparatus 120.

As described, the vehicle exterior environment recognition system 100 may identify the objects such as the pedestrian and the bicycle that cross the traveling path in the lateral direction of the own vehicle. Regarding the objects such as the pedestrian and the bicycle that cross the traveling path, it is desirable to determine their pedestrian-likeliness or bicycle-likeliness, based on their outlines. The bicycle, however, crosses faster than the pedestrian does. If the collision avoidance control is postponed until confirmation of the entire outline of the bicycle, a distance from the own vehicle 1 to the bicycle may become short during the postponement. This may necessitate an abrupt action as the collision avoidance control. Accordingly, when the bicycle comes into the luminance image from outside the luminance image, it is desirable to promptly recognize its bicycle-likeliness, upon grasping a part of the bicycle, leading to enhanced responsiveness. In the implementation, therefore, when a wheel (i.e., a front wheel) as the part of the bicycle appears on the screen, it is desirable to appropriately determine its wheel-likeliness, to promptly detect the bicycle, and furthermore, to perform the collision avoidance control with stability.

In the following, a description is given in detail of a configuration of the vehicle exterior environment recognition apparatus 120. A description is given here in detail of an identification process of the three-dimensional object (e.g., a wheel of a bicycle) in a detected region ahead of the own vehicle 1. Note that a configuration less related to features of the implementation will not be described in detail.

[Vehicle Exterior Environment Recognition Apparatus 120]

Figure 2:
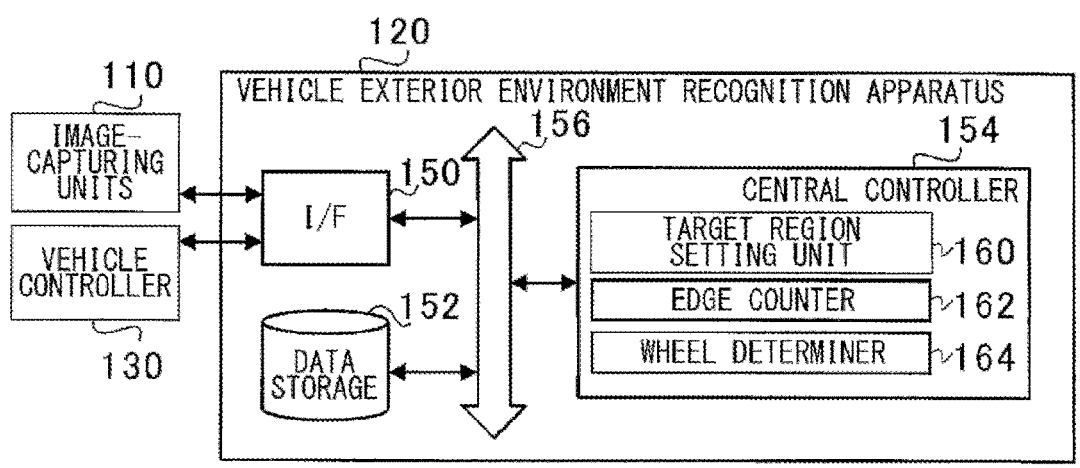
FIG. 2 is a functional block diagram illustrating schematic functions of a vehicle exterior environment recognition apparatus.

FIG. 2 is a functional block diagram illustrating schematic functions of the vehicle exterior environment recognition apparatus 120. Referring to FIG. 2, the vehicle exterior environment recognition apparatus 120 may include an interface (I/F) 150, a data storage 152, and a central controller 154.

The interface 150 may exchange information bilaterally between devices including, without limitation, the image-capturing units 110 and the vehicle controller 130. The data storage 152 may include a random access memory (RAM), a flash memory, a hard disk drive (HDD), or any other suitable storage device. The data storage 152 may store various pieces of information necessary for processes to be carried out by the functional blocks to be described hereinafter.

The central controller 154 may include a semiconductor integrated circuit, and may control devices including, without limitation, the interface 150 and the data storage 152 through a system bus 156. The semiconductor integrated circuit may have devices such as, but not limited to, a central processing unit (CPU), a read only memory (ROM) in which programs, etc., are stored, and a random access memory (RAM) serving as a work area. In this implementation, the central controller 154 may function as a target region setting unit 160, an edge counter 162, and a wheel determiner 164. In the following, a detailed description is given, based on operation of each functional blocks of the central controller 154 as well, of a vehicle exterior environment recognition process that involves, as a feature of the implementation, recognizing a bicycle.

[Vehicle Exterior Environment Recognition Process]

Figure 3:
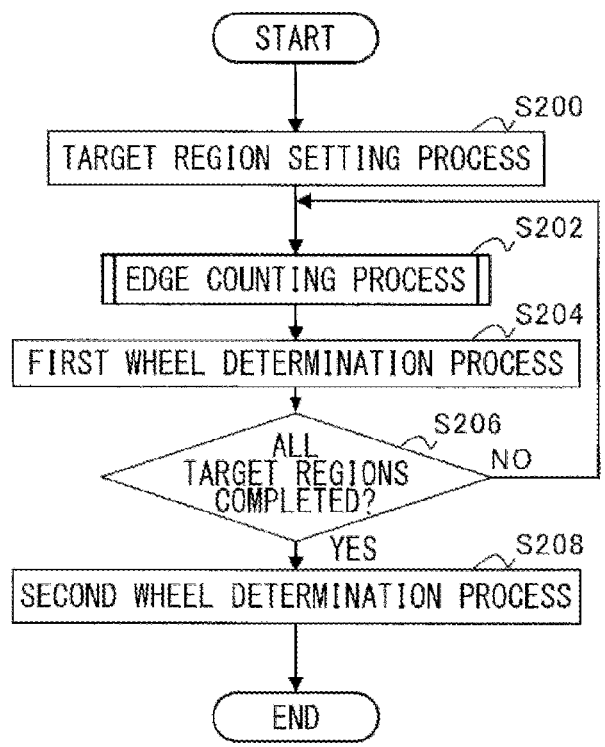
FIG. 3 is a flowchart of a flow of a vehicle exterior environment recognition process.

FIG. 3 is a flowchart of a flow of the vehicle exterior environment recognition process. The vehicle exterior environment recognition process may involve execution of the following processes: a target region setting process (S200);

an edge counting process (S202); a first wheel determination process (S204); a completion confirmation process (S206); and a second wheel determination process (S208). The target region setting process (S200) may involve setting, as one or more target regions, one or more predetermined ranges of a screen. The edge counting process (S202) may involve providing setting of a plurality of divided sections, by dividing each of the one or more target regions with borderlines (straight lines) radiated from a center of a relevant one of the one or more target regions, and counting the number of edges (luminance gradients) in a plurality of predetermined orientations, in each of the plurality of divided sections. The edges in the plurality of predetermined orientations may include at least horizontal, vertical, and slant edges. The first wheel determination process (S204) may involve deriving rates and centers of gravity of the edges in the plurality of orientations. The completion confirmation process (S206) may involve confirming whether determination as to wheel-likeliness has been completed for all the one or more target regions. The second wheel determination process (S208) may involve determining the wheel-likeliness of the luminance image of the target region. Here, the horizontal and vertical directions refer to lateral and longitudinal directions of the screen, respectively.

[Target Region Setting Process S200]

Figure 4A:
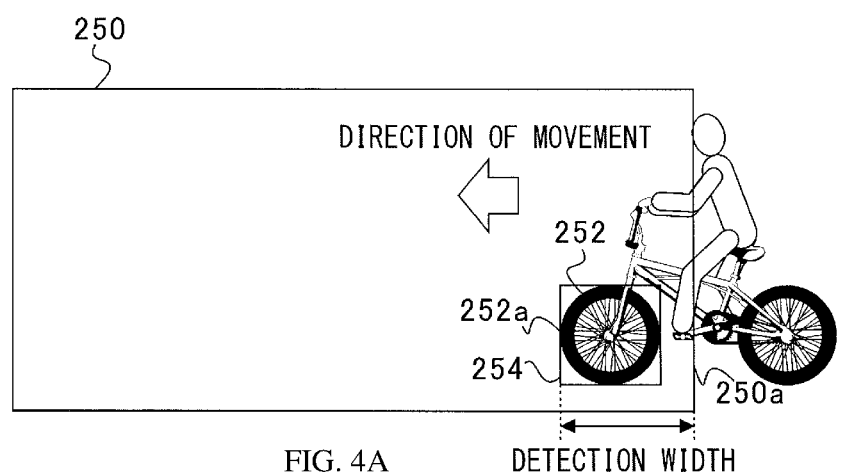
FIGS. 4A and 4B describe a target region setting process.
Figure 4B:
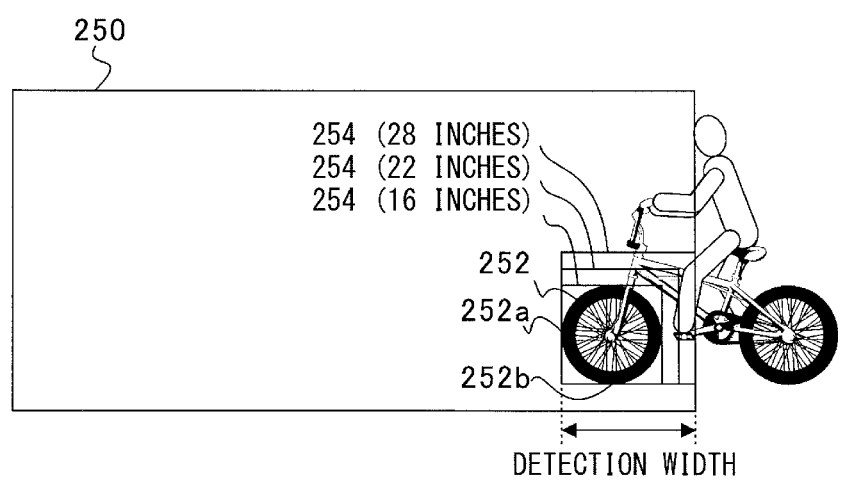

FIGS. 4A and 4B are provided for a description of the target region setting processing S200. The target region setting unit 160 may refer to a plurality of continuous (time-divided) luminance images 250 generated by the image-capturing units 110, and detect a three-dimensional object 252, based on a difference between the luminance images 250 generated at different timing. The three-dimensional object 252 may be an object that comes into the luminance image 250 from outside the luminance image 250, and may satisfy predetermined conditions. Here, the predetermined conditions may be as follows: a relative distance from the three-dimensional object 252 to the own vehicle 1 is equal to or smaller than a predetermined distance (e.g., 20 m); a height of the three-dimensional object 252 is equal to or smaller than a predetermined height (e.g., 2 m); and a duration of time during which the three-dimensional object 252 is continuously detected is equal to or shorter than predetermined time (e.g., 1.5 seconds).

As illustrated in FIG. 4A, the target region setting unit 160 may set, as a target region 254, a predetermined range of a luminance screen, when a horizontal width of the three-dimensional object 252 becomes equal to a predetermined detection width. The horizontal width of the three-dimensional object 252 may be a difference between an end 250a of the luminance image 250 and an end 252a of the three-dimensional object 252. At this occasion, the target region setting unit 160 may set, as a direction of movement of the three-dimensional object 252, a direction of the end 252a of the three-dimensional object 252 horizontally with respect to the end 250a of the luminance image 250. In one specific but non-limiting implementation, as illustrated in FIG. 4A, the direction of movement may be leftward, when the three-dimensional object 252 is located on right side of the luminance image 250. The direction of movement may be rightward, when the three-dimensional object 252 is located on left side of the luminance image 250. In this way, the target region setting unit 160 may set, as the target region 254, a part of the three-dimensional object 252 that moves horizontally in the traveling direction of the own vehicle 1.

Here, the setting of the target region 254 may be postponed until the width of the three-dimensional object 252 becomes equal to the predetermined detection width, in order to allow the width of the three-dimensional object 252 to become large enough to recognize a wheel, as intended in the implementation.

The wheels of the bicycles are available in a plurality of sizes based on a plurality of specifications. The target region setting unit 160 may, therefore, provide setting of a plurality of target regions 254 that are differently sized based on the plurality of specifications of the wheel of the bicycle. In one specific but non-limiting implementation, as illustrated in FIG. 4B, the target region setting unit 160 may provide setting of the plurality of square-shaped target regions 254. Each of the plurality of square-shaped target regions 254 may include, as its two sides, the end 252a of the three-dimensional object 252 and a road surface 252b. The plurality of square-shaped target regions 254 may include a 16 inches by 16 inches square, a 22 inches by 22 inches square, and a 28 inches by 28 inches square, without limitation. When a size of the wheel of the bicycle approximates with a size of the target region 254, more points associated with the wheel-likeliness may be assigned, which contributes to determination that the three-dimensional object 252 is likely to be the wheel, as described later. Note that the predetermined detection width may be set as a value equal to or larger than a maximum value, e.g., 28 inches (that corresponds to 350 pixels, for instance), of the plurality of target regions 254. This allows for the setting of all the plurality of target regions 254 in different sizes.

[Edge Counting Process S202]

Figure 5:
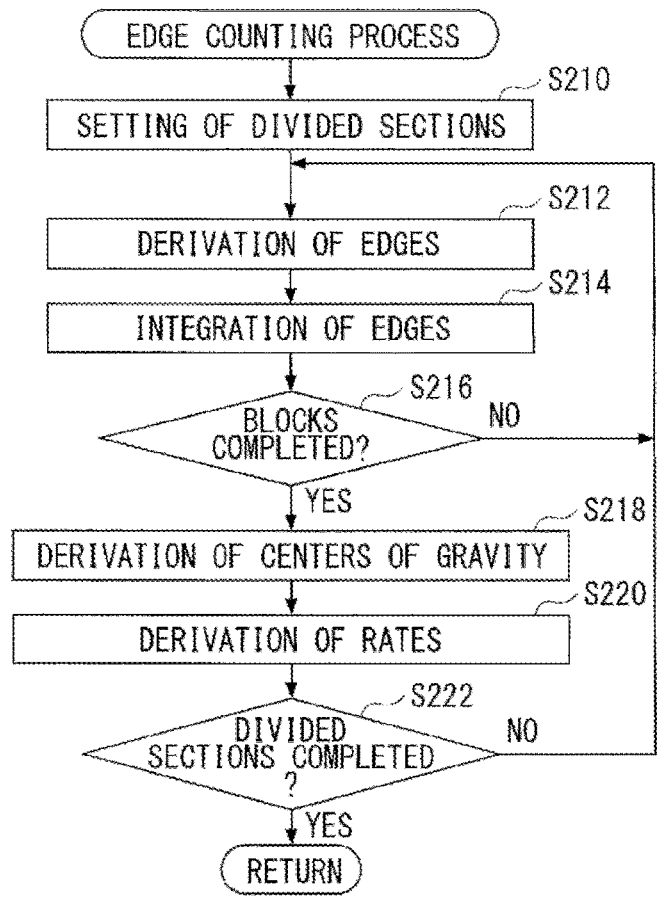
FIG. 5 is a flowchart of a flow of an edge counting process.
Figure 6:
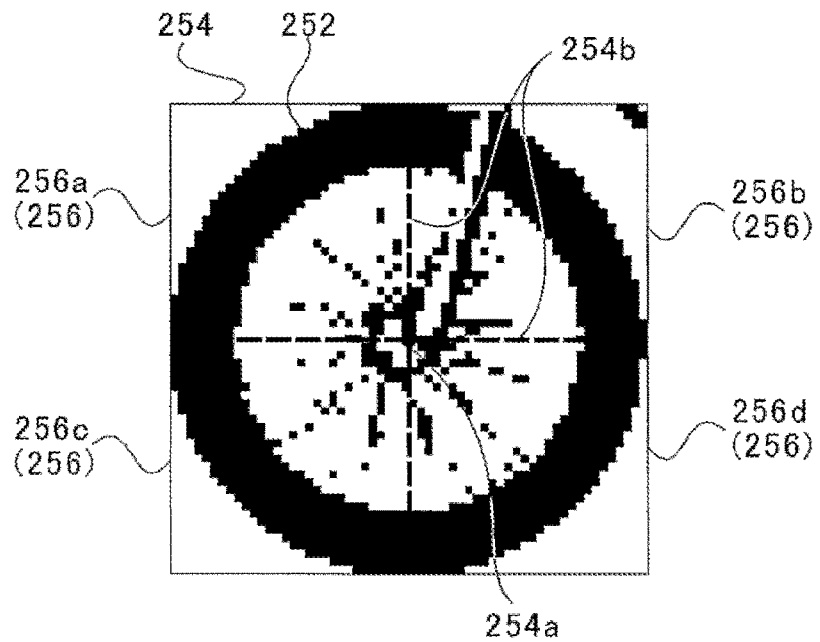
FIG. 6 describes the edge counting process.

FIG. 5 is a flowchart of a flow of the edge counting process S202. FIGS. 6 and 7 are provided for a description of the edge counting process S202. The description here is given on one implementation in which the three-dimensional object 252 is a 16-inch wheel, for easier understanding.

Referring to FIG. 6, the edge counter 162 may provide the setting of the plurality of divided sections 256 (step S210), by dividing the target region 254 with borderlines 254b radiated from a center 254a of the 16-inch target region 254 out of the plurality of target regions 254 set by the target region setting unit 160. In one implementation illustrated in FIG. 6, the edge counter 162 may provide the setting of the four divided sections 256 (256a, 256b, 256c, and 256d), by dividing the target region 254 with the borderlines 254b radiated horizontally and vertically from the center 254a of the target region 254.

In the implementation, the determination as to the wheel-likeliness may be made, with use of the following: when the three-dimensional object 252 is a point-symmetrical wheel, a positional relation of the edges to the center 254a is substantially same, with respect to the divided sections 256 equally divided with the radiated lines 254b; and each of the divided sections 256 includes a quarter (¼) circle that corresponds to a tire.

Note that, in the implementation, as described later, the edge counter 162 may derive the edges, so as to allow, in particular, the slant edges to appear easily, among the edges in the plurality of predetermined orientations. The edge counter 162 may, therefore, equally divide the target region 254 with the horizontally and vertically radiated lines 254b, allowing for use of many slant edges as samples.

Thereafter, the edge counter 162 may extract any block (two pixels horizontally by two pixels vertically) from any one of the divided sections 256, and derive the edges in the plurality of predetermined orientations that may include at least the slant edges (S212). Non-limiting examples of the edges in the plurality of predetermined orientations may include the horizontal edges, the vertical edges, and the slant edges.

FIG. 7A illustrates modes of emergence of the edges. For instance, assume that any block 260a in the divided section 256c may have, when enlarged, luminance distribution as illustrated in FIG. 7B, and that any block 260b in the divided section 256b may have, when enlarged, luminance distribution as illustrated in FIG. 7C. Also, assume that luminance ranges from 0 to 255 both inclusive, and that, in FIG. 7B, solid white and solid black correspond to luminance "200" and luminance "0", respectively. Here, a horizontal component of the edge may be defined as (B+D)−(A+C), while a vertical component of the edge as (A+B)−(C+D), in which A denotes luminance of an upper left pixel of the block in the figure, B luminance of an upper right pixel, C luminance of a lower left pixel, and D luminance of lower right pixel.

Then, the horizontal component of the edge of the block 260a illustrated in FIG. 7B may be given as follows: (B+D)−(A+C)=(0+0)−(200+200)=−400. The vertical component of the edge as follows: (A+B)−(C+D)=(200+0)−(200+0)=0. Thus, the horizontal component may be "−400", and the vertical component may be "0". It follows, therefore, that the edge may be the horizontal edge represented by an arrow directed horizontally leftward as illustrated in FIG. 7D. Note that a rightward direction on the screen denotes positive for the horizontal component, and an upward direction on the screen denotes positive for the vertical component.

Similarly, the horizontal component of the edge of the block 260b illustrated in FIG. 7C may be given as follows: (B+D)−(A+C)=(0+0)−(0+200)=−200. The vertical component of the edge as follows: (A+B)−(C+D)=(0+0)−(200+0)=−200. Thus, the horizontal component may be "−200", and the vertical component may be "−200". It follows, therefore, that the edge may be the slant edge represented by an arrow directed lower-leftward on the screen as illustrated in FIG. 7E.

As described, the subtraction of one half of the block from another half of the block makes it possible to remove an offset, a noise, or both in luminance included in the entire block. This allows for appropriate extraction of the edges. Also, the edges may be derived with simple calculation including solely addition and subtraction, leading to a smaller calculation burden.

Here, it is desirable to derive a rate of the edges thus derived to the entire divided section 256. However, if the derived values of the horizontal component and the vertical component were simply used as the edge, there would be an infinite number of variations of the edge. Thus, within the infinite number of variations, a range of the edges should be set in which the edges may be considered as a same edge. In the implementation, therefore, the horizontal component and the vertical component each may be defined in unit length, to simplify the variations of the edges. In other words, the horizontal component and the vertical component each may be regarded as either one of negative one (−1), zero (0), and positive one (+1). Then, as illustrated in FIG. 7G, the edges may be limited to those in eight orientations spaced 45° from one another. Here, a numeral affixed to each of the orientations in FIG. 7G denotes an identifier of the orientation.

With the derivation of the edges simplified in this way, when one or both of the horizontal component and the vertical component are not zero (0), the relevant component may have the unit length. For instance, in the cases in which the horizontal components are negative one (−1) and positive one (+1) in luminance, a difference in luminance between these cases is only two (2), but the edges are oppositely oriented. Thus, a dead zone may be provided in the derivation of the edges. That is, when an absolute value of the horizontal component or the vertical component is smaller than a predetermined threshold (e.g., 20), the edge counter 162 may regard the horizontal component or the vertical component as zero (0). In other words, the edge counter 162 may determine that the block does not include the edge. In this way, it is possible to avoid unstable emergence of the edge due to the horizontal component or the vertical component generated as a noise.

The description here is given of an implementation in which the predetermined threshold is a fixed value. However, the predetermined threshold may be a variable value. In one implementation, the image-capturing units 110 may have a property that an amount of noise increases as luminance increases. It is therefore desirable that the predetermined threshold may be obtained by a gradually-increasing function in accordance with luminance in the block, e.g., an average value of all luminance values in the block. Non-limiting examples of the gradually-increasing function may be a linear function with the average value of luminance as an argument. In this way, it is possible to avoid instability of the edges due to a noise, regardless of variation in the amount of the noise due to overall unevenness in luminance in the block. At this occasion, when the luminance in the block is totally high, the predetermined threshold may also become high. This, however, does not interfere with the derivation of the edges, since the horizontal component and the vertical component also become large in a high luminance range.

Note that, in the implementation, the edge counter 162 may derive the edges, so as to allow the slant edges (the 2nd-, 4th-, 6th-, and 8th-oriented ones as illustrated in FIG. 7G) to appear more easily than the horizontal edges (the 3rd- and 7th-oriented ones as illustrated in FIG. 7G) and the vertical edges (the 1st- and 5th-oriented ones as illustrated in FIG. 7G). In one specific but non-limiting implementation, as illustrated in FIG. 7B, when the component in either one direction out of the horizontal and vertical directions is a significant value (i.e., the absolute value is equal to or larger than the predetermined threshold) while the remaining component is substantially zero (0), (i.e., the absolute value is smaller than the predetermined threshold), the edge may be determined as the horizontal edge or the vertical edge. The components in both the horizontal and vertical directions are significant values (i.e., the absolute values are equal to or larger than the predetermined threshold), the edge may be determined as the slant edge. Accordingly, with respect to the divided section 256, the edge may be mostly determined as the slant edge, unless the edge is not the horizontal edge or the vertical edge. One reason for this may be as follows. In the vehicle exterior environment, many three-dimensional objects have horizontal or vertical parts. Therefore, the edge that is exactly neither horizontal nor vertical may be categorized as the slant edge, to prevent the edge from being misrecognized as the three-dimensional object. In this technique, with respect to the circular-shaped three-dimensional object such as a wheel, the horizontal edges or the vertical edges rarely appear. Instead, almost solely the slant edges appear.

Meanwhile, the edge counter 162 may integrate the total number of blocks, every time the block is extracted from within the divided section 256. In one implementation, the total number of blocks may serve as "total number of blocks". The total number of blocks may be integrated regardless of whether or not the edge counter 162 has determined that the block includes the edge (either one of the horizontal edge, the vertical edge, and the slant edge).

When the orientation of the edge with respect to the block is derived, the edge counter 162 may integrate the number of the edges in the orientation derived, and integrate a coordinate of the block as a coordinate of the orientation derived (S214). In one implementation, the number of the edges in the orientation derived may serve as an "orientation number", and the coordinate of the orientation derived may serve as a "coordinate integration value". In one specific but non-limiting implementation, when the slant edge (the 6th-oriented one as illustrated in FIG. 7G) as illustrated in FIG. 7E is derived with respect to any block, the orientation number regarding the 6th orientation in FIG. 7G may be incremented by one (1), and the coordinate (an x coordinate and a y coordinate) of the block may be integrated as the coordinate integration value regarding the 6th orientation in FIG. 7G. Note that, regarding any block that has not been determined as the edge since the absolute value of the horizontal component or the vertical component is smaller than the predetermined threshold (e.g., 20), the integration of the orientation number and the coordinate integration value is not performed.

Thereafter, the edge counter 162 may determine whether or not the extraction of all the blocks in the relevant divided section 256 have been completed (S216). When not completed (NO in S216), the edge counter 162 may newly extract the block and repeat the processes from the edge derivation process S212. When completed, i.e., the extraction of all the blocks in the divided section 256 has been completed (YES in S216), the flow may proceed to a next process.

Thereafter, the edge counter 162 may divide a coordinate integration value for each of the orientations of the edges by the orientation number, to derive a center of gravity in each of the orientations of the edges (S218). Thus, the eight centers of gravity may be derived for each of the divided sections 256.

The edge counter 162 may also divide the orientation number of each of the orientations of the edges by the total number of the blocks, to derive the rate (%) of the edges in each of the orientations (S220). It follows, therefore, that the rates of the edges in the eight orientations may be derived for each of the divided sections 256.

Thereafter, the edge counter 162 may determine whether or not the process has been completed for all the plurality of divided sections 256 (S222). When not completed (NO in S222), the edge counter 162 may newly provide the setting of the divided sections 256, and repeat the processes from the edge derivation process S212. When completed (YES in S222), the edge counter 162 may finish the relevant edge counting process S202.

[First Wheel Determination Process S204]

The wheel determiner 164 may determine the wheel-likeliness of the image of the target region 254, based on relative distances from the centers of gravity to a reference position. The centers of gravity may be derived by the edge counter 162, for each of the divided sections 256. The reference position may be predetermined for each of the divided sections 256. In one specific but non-limiting implementation, the reference position may be located at 20 cm from the center 254a.

In one specific but non-limiting implementation, in the divided section 256a on upper left side in the target region 254 and the divided section 256d on lower right side in the target region 254, the slant edges, in particular, the 4th- and 8th-oriented slant edges as illustrated in FIG. 7G may be subjected to the determination. In the divided section 256b on upper right side in the target region 254 and the divided section 256c on lower left side in the target region 254, the slant edges, in particular, the 2nd- and 6th-oriented slant edges as illustrated in FIG. 7G may be subjected to the determination. Regarding the divided sections 256a and 256d, therefore, the wheel determiner 164 may derive the relative distances from the centers of gravity of the 4th- and 8th-oriented slant edges as illustrated in FIG. 7G to the reference position in each of the divided sections 256a and 256d. Regarding the divided sections 256b and 256c, the wheel determiner 164 may derive the relative distances from the centers of gravity of the 2nd- and 6th-oriented slant edges as illustrated in FIG. 7G to the reference position in each of the divided sections 256b and 256c.

The wheel determiner 164 may set a coefficient as a predetermined first coefficient (e.g., 1.0), when the relative distances of the divided sections 25a, 256b, 256c, and 256d fall within a range of a predetermined first distance (e.g., 8 cm). The wheel determiner 164 may set the coefficient as a predetermined second coefficient (e.g., 0.85), when the relative distances do not fall within the range of the first distance but fall within a range of a predetermined second distance (e.g., 16 cm). The wheel determiner 164 may set the coefficient as a predetermined third coefficient (e.g., 0.75), when the relative distances do not fall within the range of the second distance but fall within a range of a predetermined third distance (e.g., 24 cm). The wheel determiner 164 may set the coefficient as a predetermined fourth coefficient (e.g., 0.0), when the relative distances do not fall within the range of the third distance. As the coefficient is larger, the image of the target region 254 is more likely to be the wheel. Note that the first to third distances and the first to fourth coefficients may be set to different values depending on the sizes of the target regions 254.

The wheel determiner 164 may determine the wheel-likeliness of the image of the target region 254, based on the rates for each of the divided sections 256 derived by the edge counter 162.

The determination of the rates may be made in a similar manner to that of the centers of gravity. In the divided section 256a on the upper left side in the target region 254 and the divided section 256d on the lower right side in the target region 254, the 4th- and 8th-oriented slant edges as illustrated in FIG. 7G may be subjected to the determination. In the divided section 256b on the upper right side in the target region 254 and the divided section 256c on the lower left side in the target region 254, the 2nd- and 6th-oriented slant edges as illustrated in FIG. 7G may be subjected to the determination. Regarding the divided sections 256a and 256d, therefore, the wheel determiner 164 may determine the wheel-likeliness, based on the rate of the 4th- and 8th-oriented slant edges (as a total) as illustrated in FIG. 7G in each of the divided sections 256a and 256d. As the rate is higher, the wheel determiner 164 may determine that the target region 254 is more likely to be the wheel. Regarding the divided sections 256b and 256c, the wheel determiner 164 may determine the wheel-likeliness, based on the rate of the 2nd- and 6th-oriented slant edges (as a total) as illustrated in FIG. 7G in each of the divided sections 256b and 256c. As the rate is higher, the wheel determiner 164 may determine that the target region 254 is more likely to be the wheel.

In the implementation, the wheel determiner 164 may multiply the rate for each of the divided sections 256 by the coefficient as described above. Furthermore, the wheel determiner 164 may weight the divided sections 256. Setting of the weighting may be provided to allow a movement-wise and road-surface-wise one of the divided sections 256 to be more heavily weighted against remaining ones of the divided sections 256. A road-surface-wise direction refers to the vertical direction toward the road surface on which the three-dimensional object 252 is located. One reason for this may be as follows. In the target region 254, edges other than those of a wheel are highly likely to be observed in vicinity of a driver of a bicycle, while edges of the wheel tend to be observed, far away from the driver, in the movement-wise and road-surface-wise one of the divided sections 256. The weighting, therefore, may satisfy the following relation: the divided section 256c≥the divided section 256a≥the divided section 256d≥the divided section 256b. Here, one reason for the relation: the divided section 256a≥the divided section 256d may be as follows. When the driver of the bicycle carries baggage, edges of the baggage tend to appear in the divided section 256d.

With the weighting reflected, the determination of the wheel-likeliness may be made as follows. In one specific but non-limiting implementation, regarding the divided section 256c, the wheel determiner 164 may assign points calculated by multiplying five by (5×) the coefficient, when the rate of the 2nd- and 6th-oriented slant edges as illustrated in FIG. 7G is equal to or higher than 30%; points calculated by multiplying three by (3×) the coefficient, when the rate ranges from 25% inclusive to 30% exclusive; points calculated by multiplying two by (2×) the coefficient, when the rate ranges from 20% inclusive to 25% exclusive; and no points, when the rate is lower than 20%.

Similarly, regarding the divided section 256a, the wheel determiner 164 may assign points calculated by multiplying four by (4×) the coefficient, when the rate of the 4th- and 8th-oriented slant edges as illustrated in FIG. 7G is equal to or higher than 30%; points calculated by multiplying three by (3×) the coefficient, when the rate ranges from 25% inclusive to 30% exclusive; points calculated by multiplying two by (2×) the coefficient, when the rate ranges from 20% inclusive to 25% exclusive; and no points, when the rate is lower than 20%. Regarding the divided section 25d, the wheel determiner 164 may assign points calculated by multiplying four by (4×) the coefficient, when the rate of the 4th- and 8th-oriented slant edges as illustrated in FIG. 7G is equal to or higher than 27%; points calculated by multiplying two by (2×) the coefficient, when the rate ranges from 22% inclusive to 27% exclusive; points calculated by multiplying one by (1×) the coefficient, when the rate ranges from 17% inclusive to 22% exclusive; and no points, when the rate is lower than 17%. Regarding the divided section 256b, the wheel determiner 164 may assign points calculated by multiplying three by (3×) the coefficient, when the rate of the 2nd- and 6th-oriented slant edges as illustrated in FIG. 7G is equal to or higher than 25%; points calculated by multiplying two by (2×) the coefficient, when the rate ranges from 20% inclusive to 25% exclusive; points calculated by multiplying one by (1×) the coefficient, when the rate ranges from 15% inclusive to 20% exclusive; and no points, when the rate is lower than 15%. Thereafter, the wheel determiner 164 may add up the points assigned, for each of the divided sections 256, to obtain total number of points that indicates the wheel-likeliness of the target region 254.

Note that it is sufficient that the weighting satisfy the relation: the divided section 256c≥the divided section 256a≥the divided section 256d≥the divided section 256b. It should be appreciated that criteria (%) of the determination and numerical values assigned in association with the criteria may be set as any values.

[Completion Confirmation Process S206]

Thereafter, the wheel determiner 164 may determine whether or not the process has been completed regarding all the plurality of target regions 254 (S206). When not completed (NO in S206), the wheel determiner 164 may newly set the target region 254, and repeat the processes from the edge counting process S202. When completed (YES in S206), the flow may proceed to a next process.

[Second Wheel Determination Process S208]

The wheel determiner 164 may compare the total numbers of points of the three target regions 254 of 16 inches, 22 inches, and 28 inches with one another, and allow the target region 254 having the largest total number of points to be subjected to the determination. One reason may be as follows. There is high possibility that the size of the target region 254 having the largest total number of points coincides with or approximates with the size of the wheel.

Thereafter, the wheel determiner 164 may determine that the target region 254 is likely to be the wheel with high probability, when the largest total number of points is larger than 12 points; that the target region 254 is likely to be the wheel with intermediate probability, when the largest total number of points ranges from 10 points inclusive to 12 points exclusive; and that the target region 254 is likely to be the wheel with low probability, when the largest total number of points ranges from 8 points inclusive to 10 points exclusive. Thereafter, the wheel determiner 164 may synthetically determine whether the three-dimensional object 252 is a bicycle, based on other pieces of information (e.g., a crossing speed) and other data. The determination of the wheel-likeliness in the second wheel determination process S208, therefore, may serve as one of parameters to identify the three-dimensional object 252 as the bicycle. The determination of the wheel-likeliness may not immediately result in the determination that the three-dimensional object 252 is the bicycle.

When the three-dimensional object 252 is determined as the bicycle, the vehicle exterior environment recognition apparatus 120 may execute the collision avoidance control to avoid a collision with the three-dimensional object 252.

In the implementation, the determination of circular-shape-likeliness of the wheel may be made by deriving the centers of gravity and the rates of the edges in the predetermined orientations for each of the divided sections 256. With this configuration, it is possible to promptly detect the specific object such as the bicycle with a small processing load by means of simple calculation, without executing burdensome calculation processing such as Hough transformation.

The implementation also provides a program that causes a computer to function as the vehicle exterior environment recognition apparatus 120, and a recording medium that stores the program. The recording medium is computer readable. Non-limiting examples of the recording medium may include a flexible disk, a magneto-optical disk, ROM, CD, DVD (Registered Trademark), and BD (Registered Trademark). As used herein, the term "program" may refer to a data processor written in any language and any description method.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For instance, in one implementation described above, the description is given of an example with the target regions 254 being the three squares, i.e., the 16 inches by 16 inches square, the 22 inches by 22 inches square, and the 28 inches by 28 inches square. The setting of the target regions 254, however, may be provided in any sizes, any number, or any shapes.

In one implementation described above, the description is made on an example in which the setting of the four divided sections 256 is provided by equally dividing the target region 254 with lines 254*b* radiated from the center 254*a* of the target region 254. The number of the divided sections 256, however, may be set as any values (e.g., 8 or 16). It is not necessary to equally divide the target region 254 as long as it is possible to determine a circular shape of the wheel.

In one implementation described above, the description is given of an example in which the number of the edges in each of all the plurality of orientations is obtained. The implementation, however, is not limited thereto. In an alternative implementation, solely the number of the slant edges may be obtained to derive the centers of gravity and the rates, since the determination is made solely on the slant edges.

In one implementation described above, the description is made on an example of the identification of the bicycle as the specific object by the determination of the wheel-likeliness. However, the determination may be also applied to a vehicle that includes one or more wheels, such as a motorcycle or an automobile.

A part or all of the processes in the vehicle exterior environment recognition process as disclosed herein does not necessarily have to be processed on a time-series basis in the order described in the example flowchart. A part or all of the processes in the vehicle exterior environment recognition process may involve parallel processing or processing based on subroutine.

The invention claimed is:

1. A vehicle exterior environment recognition apparatus, comprising:
a central processing unit (CPU); and
a machine-readable medium comprising instructions stored therein, which when executed by the CPU, cause the CPU to perform operations comprising:
obtaining, from an image capturing device, at least one image of vehicle exterior environment in a traveling direction of an vehicle;
setting, as one or more target regions, one or more predetermined ranges in the at least one image when at least part of an object in the traveling direction of the vehicle is captured in the at least one image, wherein the one or more predetermined ranges encompass the at least part of the object;
dividing each of the one or more target regions into a plurality of divided sections, wherein each of the one or more target regions comprises borderlines between adjacent divided sections of the plurality of divided sections, and wherein the borderlines cross a center of the target region, and wherein each of the plurality of divided sections comprises a plurality of blocks;
counting a number of blocks comprising predetermined slant edges and a total number of blocks in each of the plurality of divided sections;
determining a ratio of the number of blocks comprising the slant edges to the total number of blocks in each of the plurality of divided sections; and
determining that the at least part of the object in the one or more target regions is a wheel based on determining wheel-likeliness of the at least part of the object in the one or more target regions based on the determined ratio.

2. The vehicle exterior environment recognition apparatus according to claim 1, wherein the borderlines crosses the center of the target region horizontally and vertically.

3. The vehicle exterior environment recognition apparatus according to claim 1, further comprising deriving one or more centers of gravity of the slant edges for each of the plurality of divided sections, and
determining the wheel-likeliness of each of the one or more target regions further based on relative distances from the centers of gravity to a reference position that is predetermined for each of the plurality of divided sections.

4. The vehicle exterior environment recognition apparatus according to claim 2, further comprising deriving one or more centers of gravity of the slant edges for each of the plurality of divided sections, and
determining the wheel-likeliness of each of the one or more target regions further based on relative distances from the centers of gravity to a reference position that is predetermined for each of the plurality of divided sections.

5. The vehicle exterior environment recognition apparatus according to claim 1, wherein one of the plurality of divided sections is given more weight than remaining ones of the plurality of divided sections based on a moving direction of a section of the at least part of the object in the one of the plurality of divided sections and a position of the section of the at least part of the object in with respect to a road surface.

6. The vehicle exterior environment recognition apparatus according to claim 2, wherein one of the plurality of divided sections is given more weight than remaining ones of the plurality of divided sections based on a moving direction of a section of the at least part of the object in the one of the plurality of divided sections and a position of the section of the at least part of the object in with respect to a road surface.

7. The vehicle exterior environment recognition apparatus according to claim 3, wherein one of the plurality of divided sections is given more weight than remaining ones of the plurality of divided sections based on a moving direction of a section of the at least part of the object in the one of the plurality of divided sections and a position of the section of the at least part of the object in with respect to a road surface.

8. The vehicle exterior environment recognition apparatus according to claim 4, wherein one of the plurality of divided sections is given more weight than remaining ones of the plurality of divided sections based on a moving direction of a section of the at least part of the object in the one of the plurality of divided sections and a position of the section of the at least part of the object in with respect to a road surface.

9. The vehicle exterior environment recognition apparatus according to claim 1, wherein each of the one or more target regions is differently sized from one another based on a plurality of specifications of a wheel of a bicycle.

10. The vehicle exterior environment recognition apparatus according to claim 2, wherein each of the one or more target regions is differently sized from one another based on a plurality of specifications of a wheel of a bicycle.

11. The vehicle exterior environment recognition apparatus according to claim 3, wherein each of the one or more target regions is differently sized from one another based on a plurality of specifications of a wheel of a bicycle.

12. The vehicle exterior environment recognition apparatus according to claim 4, wherein each of the one or more target regions is differently sized from one another based on a plurality of specifications of a wheel of a bicycle.

13. The vehicle exterior environment recognition apparatus according to claim 5, wherein each of the one or more target regions is differently sized from one another based on a plurality of specifications of a wheel of a bicycle.

14. The vehicle exterior environment recognition apparatus according to claim 6, wherein each of the one or more target regions is differently sized from one another based on a plurality of specifications of a wheel of a bicycle.

15. The vehicle exterior environment recognition apparatus according to claim 7, wherein each of the one or more target regions is differently sized from one another based on a plurality of specifications of a wheel of a bicycle.

16. The vehicle exterior environment recognition apparatus according to claim 8, wherein each of the one or more target regions is differently sized from one another based on a plurality of specifications of a wheel of a bicycle.

17. A vehicle control device, comprising:
a central processing unit (CPU); and
a machine-readable medium comprising instructions stored therein, which when executed by the CPU, cause the CPU to perform operations comprising:
obtaining, from an image capturing device, at least one image of vehicle exterior environment in a traveling direction of an vehicle;
setting, as one or more target regions, one or more predetermined ranges in the at least one image when at least part of an object in the traveling direction of the vehicle is captured in the at least one image, wherein the one or more predetermined ranges encompass the at least part of the object;
dividing each of the one or more target regions into a plurality of divided sections, wherein each of the one or more target regions comprises borderlines between adjacent divided sections of the plurality of divided sections, and wherein the borderlines cross a center of the target region, and wherein each of the plurality of divided sections comprises a plurality of blocks;
counting a number of blocks comprising predetermined slant edges of the plurality of blocks and a total number of the plurality of blocks in each of the plurality of divided sections;
determining a ratio of the number of blocks comprising the slant edges to the total number of blocks in each of the plurality of divided sections;
determining that the at least part of the object in the one or more target regions is a wheel based on determining wheel-likeliness of the at least part of the object in the one or more target regions based on the determined ratio; and
executing a collision avoidance control to avoid a collision with the object based on determining that the at least part of the object in the one or more target regions is a wheel.

* * * * *